United States Patent [19]

Petersen

[11] Patent Number: 4,844,237

[45] Date of Patent: Jul. 4, 1989

[54] ADJUSTABLE STORAGE CASSETTE SYSTEM FOR PRINTED PRODUCTS

[75] Inventor: Godber Petersen, Augsburg, Fed. Rep. of Germany

[73] Assignee: Man Roland Druckmaschinen AG, Offenbach am Main, Fed. Rep. of Germany

[21] Appl. No.: 157,968

[22] Filed: Feb. 18, 1988

[30] Foreign Application Priority Data

Feb. 18, 1987 [DE] Fed. Rep. of Germany ....... 3705066

[51] Int. Cl.[4] ........................................ B65G 49/00

[52] U.S. Cl. ........................... 198/803.01; 270/58; 198/465.1

[58] Field of Search .................... 270/54, 55, 57, 58; 198/861.1, 803.01, 465.1

[56] References Cited

U.S. PATENT DOCUMENTS

| | | | |
|---|---|---|---|
| 3,263,951 | 8/1966 | Stokes | 198/861.1 |
| 4,572,760 | 2/1986 | Marchetti | 198/861.1 |
| 4,598,819 | 7/1986 | Siegwart | 198/861.1 |

FOREIGN PATENT DOCUMENTS

| | | | |
|---|---|---|---|
| 123785 | 11/1984 | European Pat. Off. | 198/861.1 |
| 2140773 | 12/1973 | Fed. Rep. of Germany | 270/54 |
| 2045279 | 2/1971 | France . | |
| 27858 | 2/1982 | Japan | 271/294 |
| 59-47753 | 3/1983 | Japan . | |
| 962129 | 9/1982 | U.S.S.R. | 198/861.1 |

*Primary Examiner*—Robert E. Garrett
*Assistant Examiner*—Therese M. Newholm
*Attorney, Agent, or Firm*—Frishauf, Holtz, Goodman & Woodward

[57] ABSTRACT

To permit adjustment of the width of storage cassettes (1) adapted to hold sheet holding elements (2, 2'), while the cassettes are being moved along a transport path, the cassettes (1) formed of two facing L-shaped elements (1', 1'') connected together by a central bolt-and-nut connection (13), are supported on a support carriage (5) moving in the predetermined path. A pair of cassette holders, including electromagnets (28, 37), and supported on a platform moving at the same speed as the cassette support, engage the L-shaped legs, permitting release of the bolt-and-nut connection (13) by a suitable operating element (38, 39) attached to said platform, then re-positioning of the holders to space the L-shaped halves at a desired distance, and re-tightening of the bolt-and-nut connection, all while the platform and the support are moving. The holders are then disengaged, permitting return of the platform to a starting position for re-positioning a next cassette, while the re-positioned or re-dimensioned cassette continues to move in its moving path.

18 Claims, 6 Drawing Sheets

ADJUSTABLE STORAGE CASSETTE SYSTEM FOR PRINTED PRODUCTS

Reference to related application and patents, assigned to the assignee of the present invention, the disclosures of which are hereby incorporated by reference:

U.S. Ser. No. 07/056,786, filed May 29, 1987, KOBLER et al

U.S. Pat. No. 4,465,269, Petersen

U.S. Pat. No. 4,605,213, Hechler;

U.S. Pat. No. 4,605,212, Kobler.

The present invention relates to a storage cassette system for handling printed products, and more particularly to a storage cassette system in which printed products of different format can be stored in a minimum space, with the storage cassettes being adjusted to fit printed products of different sizes. The storage cassettes are particularly applicable for use with paper handling apparatus, such as printing machines.

BACKGROUND

The referenced U.S. Pat. No. 4,465,269, Petersen, 4,605,213, Hechler, and 4,605,212, Kobler, as well as the U.S. application Ser. 07/056,786, filed May 29, 1987, Kobler et al, all assigned to the assignee of the present application, and the disclosures of which are hereby incorporated by reference, relate to storage of printed products in holders which can be expanded or compressed in accordeon-type folds. These holder structures, which are arranged in zig-zag or accordeon pleat systems can be used to hold printed products in cassettes which, generally, include two L-shaped halves, with an upright leg and a horizontal leg, each, in which the horizontal legs face each other. The referenced application Ser. 07/056,786, filed May 28, 1987, specifically describes such a cassette.

It has been found that when folded sheet products, and particularly printed paper products, are to be further processed, some storage cassettes, if all of the same size, will be excessively large with respect to the products that they hold. This is expensive and requires more space than is actually needed for storage of the products. The format of the cassettes, then, must be designed for the maximum size of sheets which are to be handled. This maximum size, however, is not necessarily the size which is used in any particular printing job or run.

THE INVENTION

It is an object to provide a storage cassette which is capable of accepting sheet products of different sizes, and to store them, separately or in combination, so that they, for example and if desired, can be supplied with inserts, which storage cassettes and storage systems are versatile and use only as much space as is absolutely necessary for storing the specific products therein.

Briefly, the storage cassette includes the known structure having two L-shaped halves. In accordance with a feature of the invention, the two L-shaped halves are coupled together by a releasable coupling, for example a bolt-nut connection operating in an elongated slot to permit releasably connecting the halves and shifting the spacing of the upright legs of the L-shaped halves with respect to each other. The storage arrangement further includes apparatus to adjustably lock the halves together which are formed by a support and a pair of cassette holder elements positioned on the support and arranged for engagement with the respective halves of the storage cassette, and movable on the support to engage and move the L-shaped halves to the required spacing. In accordance with a feature of the invention, the support has coupled thereto a mechanism which can release the bolt-nut combination and shift the halves to the required distance as the halves are being moved longitudinally to accept storage holders retaining, or adapted to retain printed products. The bolt-nut combination is tightened, the printed products are received, and the cassette, then adjusted for the appropriate size, can be stored in a storage area, taking up only as much space as is actually needed by the printed products themselves.

The system has the advantage that the cassette structure is formed of two respectively slidable L-shaped elements which are so coupled together that their spacing can be changed. Thus, the same cassette can be used, after appropriate adjustment of the spacing of the upstanding legs of the L-shaped halves, for storing printed products of randomly selected size. In accordance with a feature of the invention, matching of the size of the storage cassette to the printed products can be obtained during transport of the storage cassette from a cassette storage region to a work station where the printed products holders are inserted —or vice versa, for example upon return to an empty-cassette store. This substantially reduces the time required for adjustment and enhances the efficiency of the storage system, both with respect to operating time as well as space requirements.

DRAWINGS

DETAILED DESCRIPTION

Figure 1:
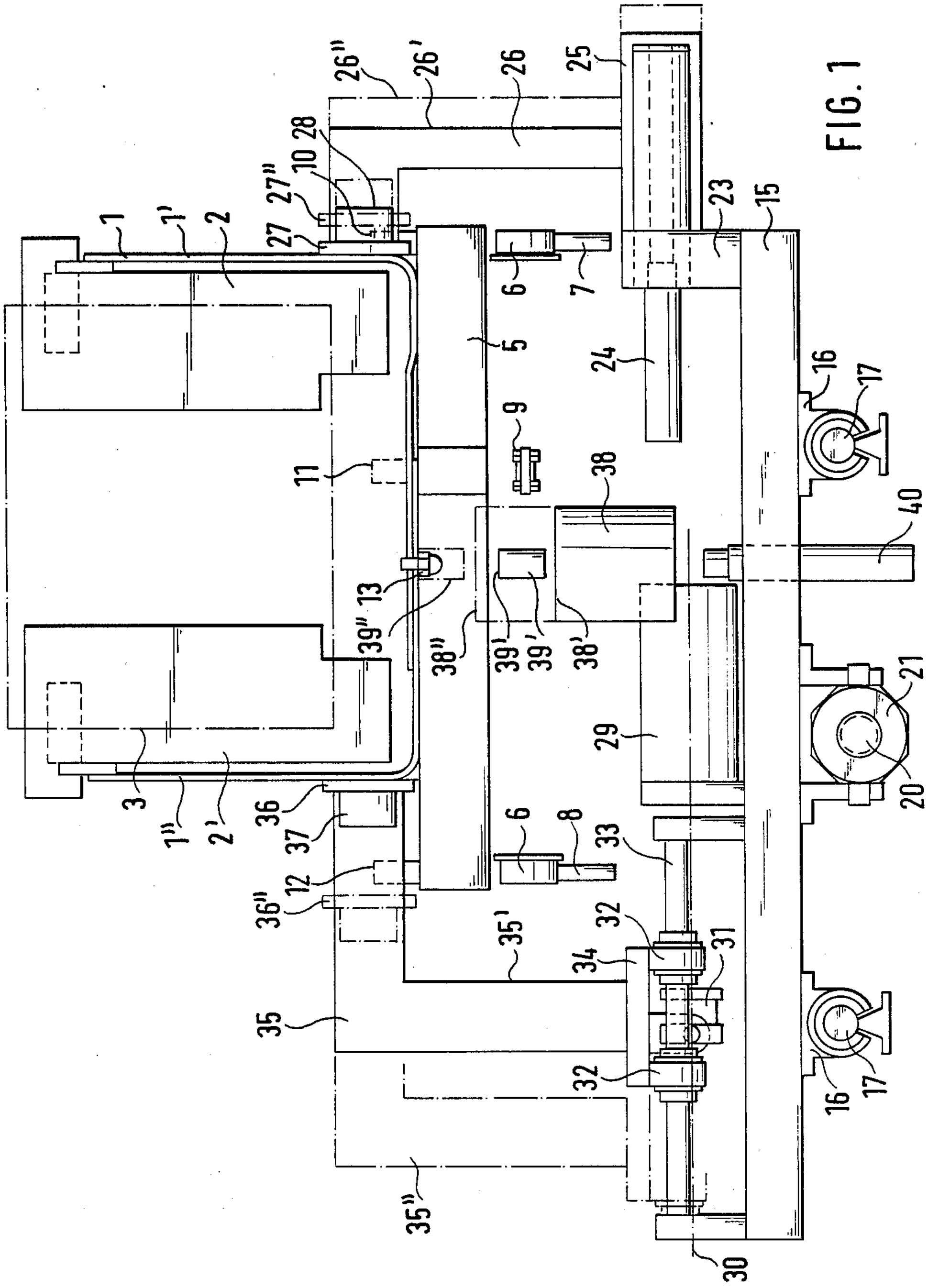
FIG. 1 is a schematic side view of a storage cassette and the adjustment mechanism therefor, in which elements not necessary for an understanding of the present invention have been omitted.
Figure 2:
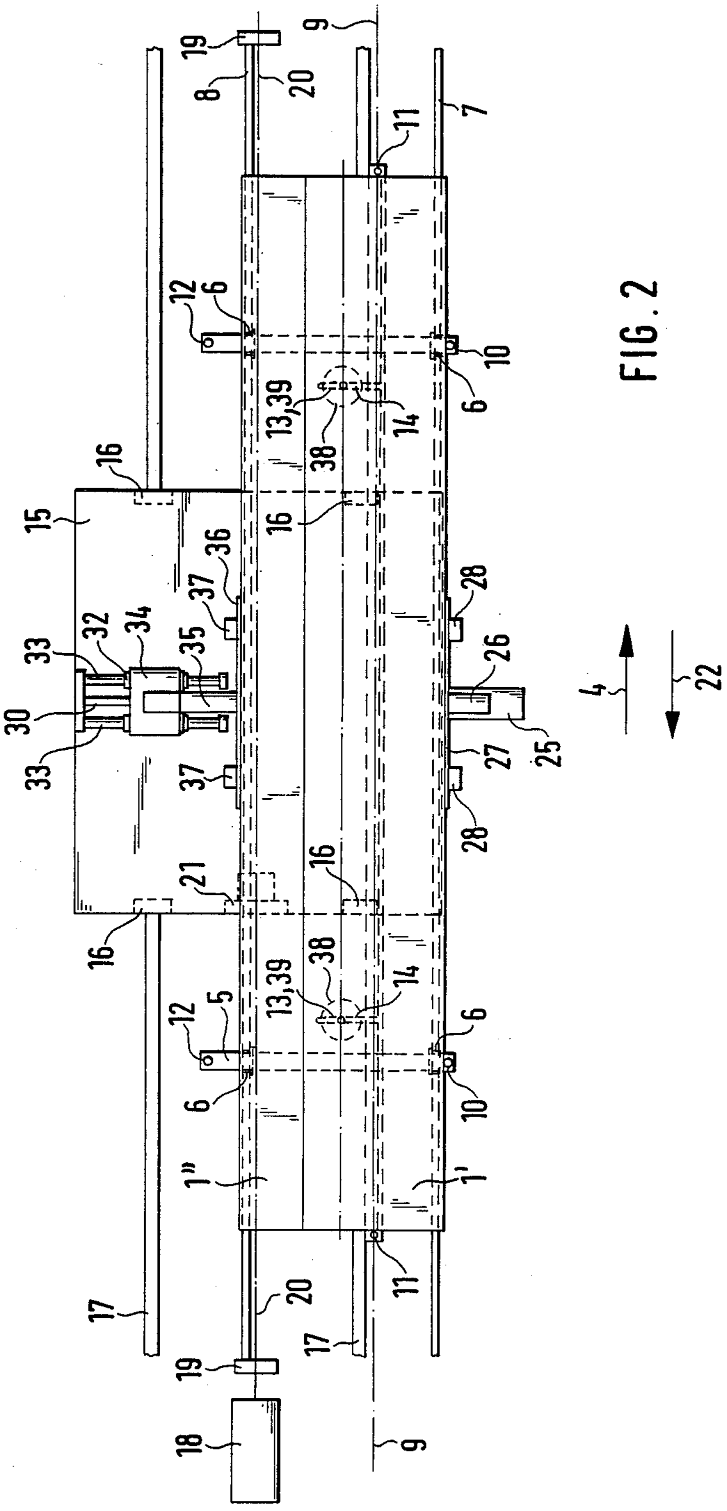
FIG. 2 is a top view of the cassette and the adjustment mechanism, and illustrating also part of the path taken by the storage cassette during its adjustment.

Printed products, for example in the form of folded products, printed sheets, inserts and the like, are stored in zig-zag or accordeon-pleat holding structures which can be inserted into a storage cassette 1 (FIGS. 1, 2). The holding structures for the sheet products are generally zig-zag or accordeon-pleated elements constructed of two halves 2, 2'. Each one of the storage holding halves 2, 2' is retained on an upright leg of L-shaped half-units 1', 1'' of the storage cassettes. The holder structures 2, 2' can be guided on the cassettes, for example for sliding movement, as explained in the referenced patents and application. The lower or horizontal legs of the L-shaped cassette halves 1', 1'' face each other. They are coupled together by a releasable coupling, formed by a bolt-and-nut connection, which will be described in detail below.

As best seen in FIGS. 1 and 2, the cassettes 1 with their zig-zag or accordeon-pleat holding structures 2, 2' can be used to retain therein printed products 3 in minimum space, by matching the size of the cassettes and, herein, the width thereof, corresponding to the respective product to be stored. The width of these products to be stored can vary. For example, the stored products 3 may be folded sheets, or printed sheets, or inserts, which singly, joined, or mixed, are introduced into the various storage compartments of the zig-zag or accordeon-pleat holding structure.

In accordance with the invention, the storage cassette 1 is capable of changing its storage volume to permit matching the size of the cassette to different formats of products to be stored therein. In its simplest form, the storage cassette can be changed in volume or spacing between the upright legs of the L-structures 1′, 1″ when the storage cassette is stationary. Preferably, and in accordance with a feature of the invention, the storage cassette can be changed in size during transport of the cassette in the direction of the arrow 4 (FIG. 2) or also counter the direction of the arrow 4, and as shown by the arrow 22.

The invention will be described in connection with an arrangement which permits adjustment of the size of the storage cassette during movement or feed thereof, for example to receive zig-zag or accordeon pleat holders 2, 2′.

The storage cassette 1 is located on a transport carriage 5 which has rollers 6 running on rails 7, 8. FIG. 1 shows wheels removed from the carriage 5; suitable holders, brackets, and bearing arrangements have been omitted from the drawing for clarity and can be constructed in accordance with appropriate engineering practice. The carriage 5 is pulled by a transport chain 9 in the direction of the arrow 4. The cassette 1 is positively located on the storage carriage by holding pins 10 and 11, which can be securely and fixedly positioned. Pins 12 are also provided which form end stops and correspond to the largest width that the cassettes may assume. This permits all around positioning of the storage cassette on the carriage 5, regardless of the format of the cassette. The pins 10, 11, 12 prevent sliding of the storage cassette 1 from the carriage 5 during transport.

The halves 1′, 1″ of the storage cassette 1 are connected by a releasable or tightenable or lockable connection, preferably in form of a screw or bolt-nut connection 13. Bolts forming part of the connection can be welded to one of the halves, for example the half 1′, and, even upon change of position of the half 1″, the spacing of the half 1′ from the pins 10 will not change. The other half 1″ has elongated holes 18 formed therein to receive the bolt-nut coupling 13. Upon release of the nut screwed on the bolt 13, the half 1″ can be shifted on the carriage 5.

Adjustment time can be saved by carrying out adjustment of the width of the storage cassette 1 during movement of the cassette 1 in the direction of the arrow 4, that is, during its transport. The required apparatus or devices to adjust the width of the cassette are located on a platform 15 which has four bearing elements 16 longitudinally shiftably located on support spindles 17, for longitudinal movement in the direction of the arrow 4. A stepping motor 18 (FIG. 2) provides for shifting of the platform 15 in the direction of the arrow 4, or of the arrow 22, respectively. The platform 15 is coupled via a worm spindle-ball-nut coupling to spindle 20 which, in turn, is connected to the stepping motor 18. Bearings 19 retain the spindle 20. A ball retention nut 21 (FIG. 1) is securely connected to the platform 15 so that, upon rotation of the motor 18, the platform 15 will be moved longitudinally.

The platform 15 supports a pneumatic piston 24, secured to a holder bracket 23. An arm 26, coupled to the pneumatic piston 24, and secured to a suitable guide element 25, can be moved by the piston 24 between two terminal positions, schematically illustrated in FIG. 1 by respective terminal lines 26′ and 26″. A rail 27 to which electromagnets 28 are secured is attached to the arm 26. The L-shaped brackets are made of material which can be magnetically attracted by the electromagnets, or has a strip of such material secured thereto in the region opposite the electromagnets.

The left side of the cassette 1, and specifically the L-shaped element 1″, is moved by a stepping motor 29 which is coupled to a spindle 30. A ball nut 31 is attached to a small or auxiliary platform 34 which is retained by four bearing elements 32 on support rods 33. The platform 34 carries an arm 35 on which a rail 36 is attached which, in turn, carries electromagnets 37.

A screwdriver or socket driver 38, preferably electrically or pneumatically operated, and having an engagement head 39, can be moved vertically upwardly or downwardly by a pneumatic piston arrangement 40 (FIG. 1), to be shifted from a lower terminal position 38′ to an upper terminal position 38″. The screwdriver or socket driver can be operated in either direction, to either loosen or tighten the screw-nut connection 13. The engagement head 39, upon vertical movement, shifts from position 39′ to position 39″ when the bolt or screw-nut connection 13 is to be changed, that is, loosened or tightened.

Operation, with reference to FIGS. 3 to 8

Figures 3, 4, 5:
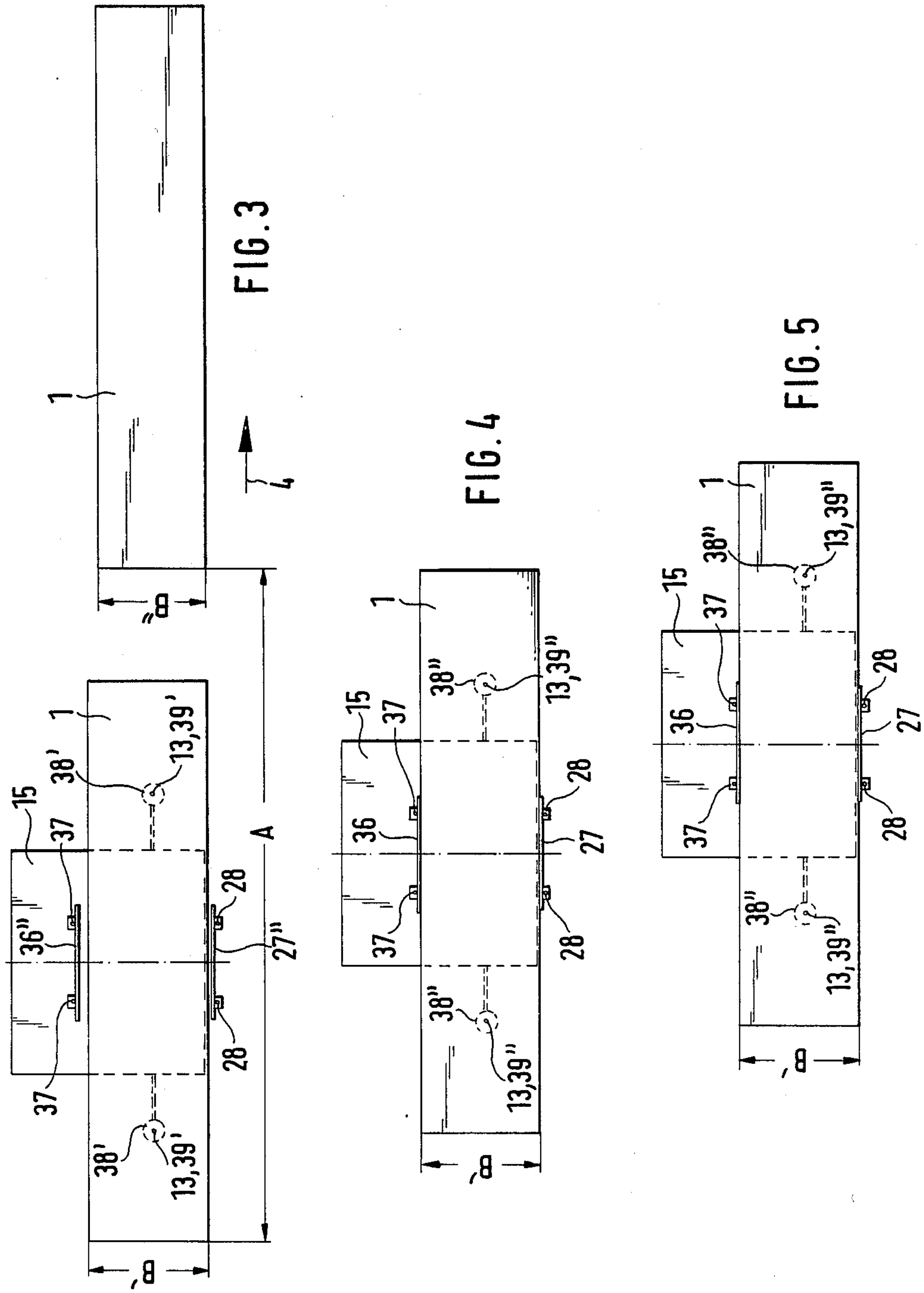
FIGS. 3 to 8 are sequential schematic views of the storage cassette and its adjustment as it travels in a path from a storage area to a product reception area, and schematically illustrating the operations to adjust the width of a storage cassette.

FIG. 3 illustrates the starting condition in which the cassette 1 is located in the reference position, schematically illustrated by dimension line 0. The storage cassette, initially, has a width B′. It is intended to shift the width of the storage cassette 1 upon transport along the path shown by the dimension arrow A to have the width B″, at a final position illustrated in FIG. 3 by the end dimension line E to assume the position 1E in FIG. 3.

The platform 15 is moved by the motor 18 to match the position of the storage cassette 1 which is moving in the direction of the arrow 4. In other words, the platform 15 will run below and parallel to the carriage 5 and with the same speed. The screw or socket head 39 is located precisely beneath the bolt-nut connection 13. During the shifting movement, the storage cassette 1 and the platform 15 operate in synchronism in the direction of the arrow 4.

Figures 6, 7, 8:
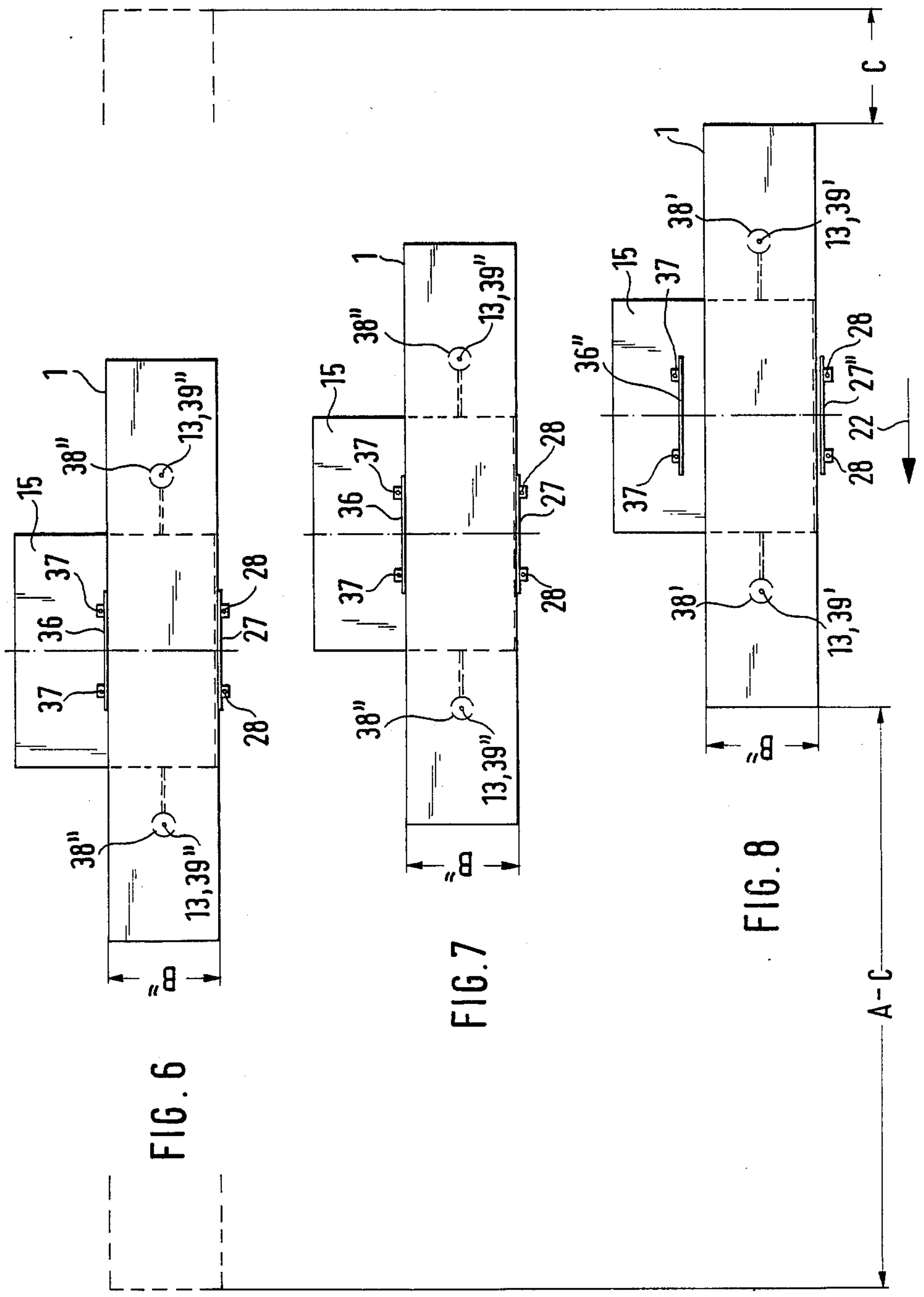

The pneumatic piston 24, forming the drive for the arms 26, is activated, and the motor 29 for the arms 36 is also activated. This moves the arms 26, 35 (FIG. 1) in the position 26′, 35′. Rails 27, 36 are engaged at the outside of the cassette halves 1′, 1″ (FIGS. 1, 2 and 4). The electromagnets 28, 37 are energized in order to retain the half elements 1′, 1″ in position. The pneumatic piston 40 feeds the screw or socket head 39 into the upper position 39′, and, after engagement of the screw or socket driver 38, the bolt-nut connection 13 is loosened (FIG. 5). FIG. 6 illustrates the position in which the rail 27, attached to the arm 26, holds the cassette half 1′ in position upon energization of the magnet 28. Since the screw-nut connection 13 has been loosened, the stepping motor 29 can now shift the cassette half 1″ by engagement of the energized magnets 37 on the rail 36 attached to the arm 35. The cassette half 1″ is now shifted into the desired position, so that the storage cassette 1 will have the desired width B″ (see FIG. 6).

As seen in FIG. 7, the screw or socket head 39, which had remained in position 39″, again tightens the bolt or screw-nut connection 13. This fixes the position of the L-shaped elements 1′, 1″ with respect to each other. The electromagnets 28, 37 can be de-energized.

FIG. 8 schematically shows that all the respectively movable apparatus elements are returned to their starting or neutral position, that is, arm 26 is shifted to position 26″, the screw or socket head 39 in the position 39′, and the arm 35 in the position 35″. Platform 15 is returned in the direction of the arrow 22. This return can be at a fast return rate, which is schematically indicated by the arrow 22 being longer than the arrow 4 in FIGS. 2 and 8. The platform 15 is thus returned to its starting position shown in FIG. 3 in order to be able to adjust the width of a subsequent storage cassette which is placed over the platform 15. The storage cassette which has been re-adjusted moves for the remaining path distance C (FIG. 8) during the fast return movement of the platform 15. Thus, during the entire adjustment time, the storage cassette passed through the path A (FIG. 3) to reach the position shown at 1E.

The pins 12 (FIG. 1) are not absolutely necessary, and it is equally possible to place similar pins with a variable spacing. If so, apparatus must be provided to shift the position of the pins 12, for example by securing another stepping motor on the platform 15, and coupling the pins 12 to the stepping motor by a spindle-and-spindlenut drive. The pins 12, then, can operate in suitable guide slots.

Figure 9:
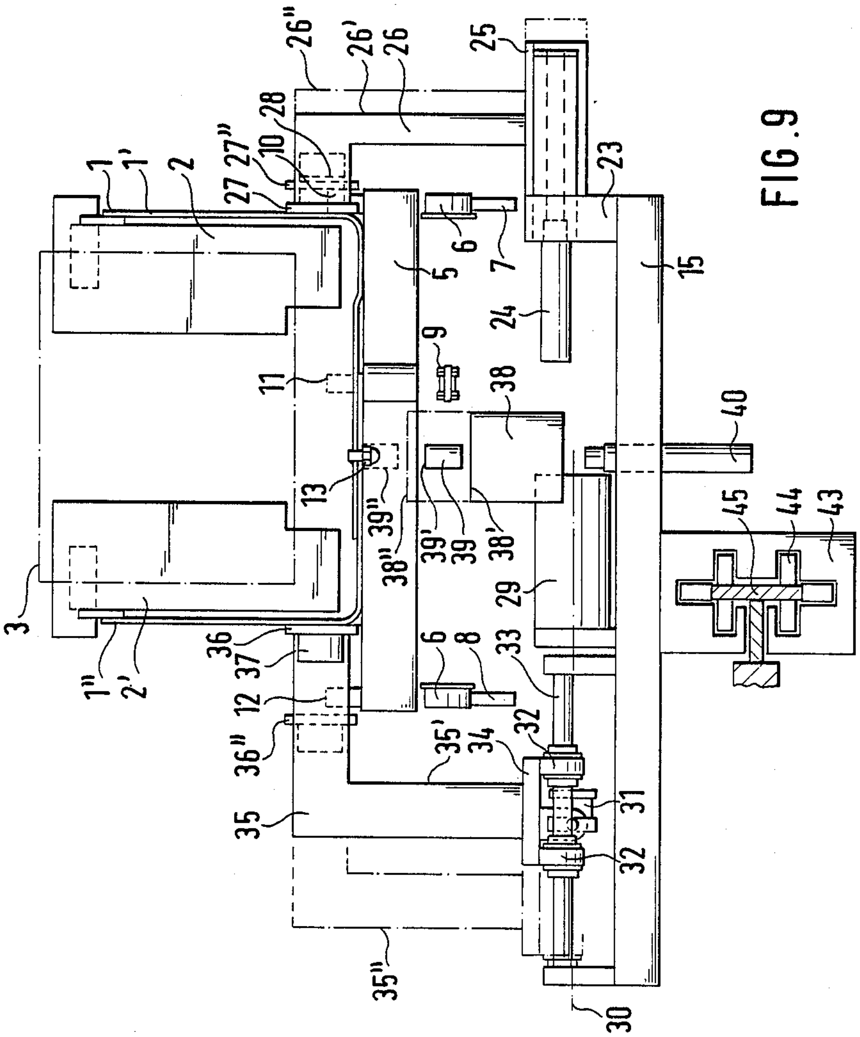
FIG. 9 is a view similar to FIG. 1, and illustrating another embodiment.
Figure 10:
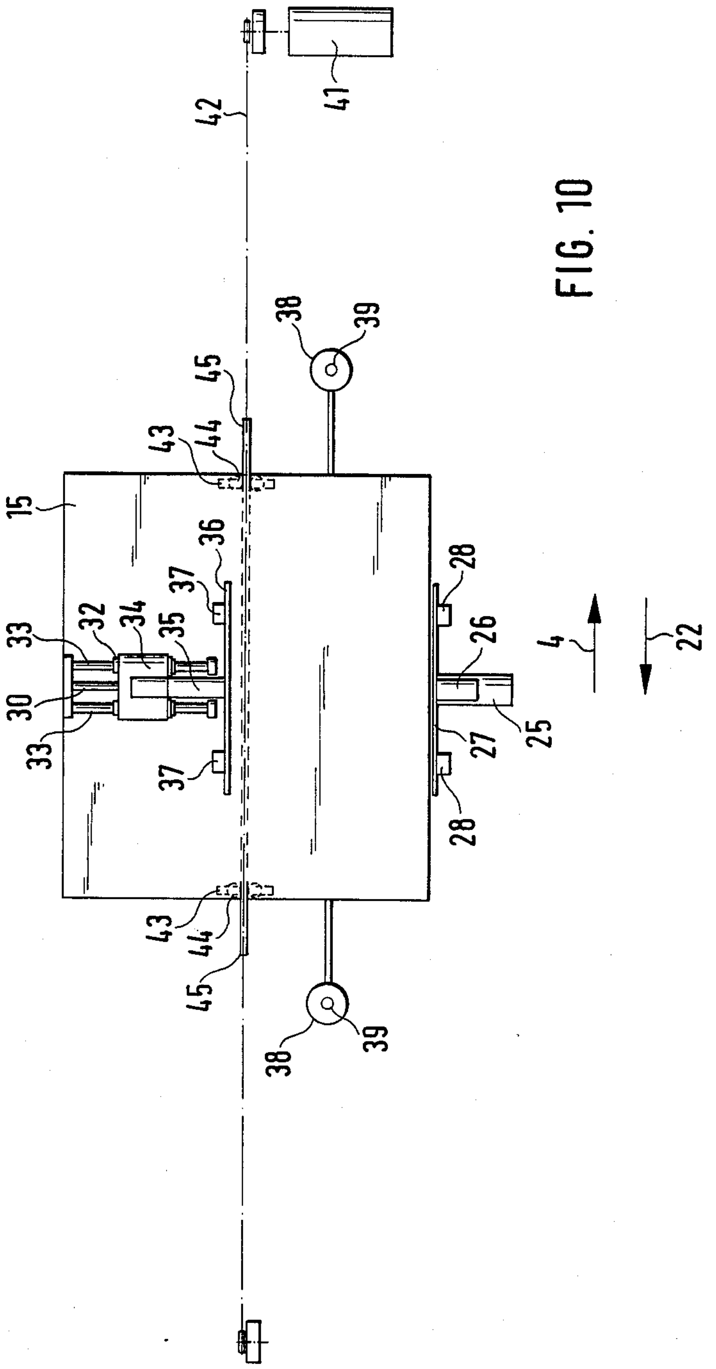
FIG. 10 is a fragmentary view similar to FIG. 2, and illustrating a modification of the arrangement of FIG. 9.

FIG. 9 illustrates another embodiment, in which the platform 15 is longitudinally guided by a chain 42 operated by a stepping motor 41, to move the platform 15 in the direction of the arrow 4 or 22, respectively. Longitudinal guidance is obtained by two guide housings 43 which retain guide rollers 44 thereon, running on support and guide rails 45, suitably positioned in a frame of the apparatus.

The invention has been described in connection with storage cassettes which are moved in a horizontal path. Of course, the invention is equally applicable to different paths of motion of the storage cassettes by suitable repositioning or relocating or reconstruction of the drive and bearing elements. Thus, the storage cassettes can be moved in an inclined path, or vertically, by suitably angularly shifting the respective guide elements and drive motors.

Of course, the width of the storage cassettes can be changed also when it is stationary, or during an intermittent movement, that is, upon start-stop movement of the storage cassette 1. If so, it is not necessary to provide for synchronous movement of the platform 15 with the movement of the storage cassette along the arrow 4. In such arrangements, the components and devices shown in FIGS. 1, 2 and 9 can be located at suitable points along the path of the storage cassette 1, the storage cassette being stopped when the respective operating positions are reached for a short period of time so that the previously described steps of holding the side walls 1′, 1″ of the storage cassettes, loosening the connection 13, repositioning the side walls, re-tightening the connection 13 and releasing the side walls, can be carried out at the respective adjustment stations or points.

Synchronized control of the speed of movement of the platform 15 and the cassette, as well as movement of the respective operating elements, can be commanded by any suitable sequencing and speed control apparatus, well known in the industry.

Various changes and modifications may be made and features described in connection with one of the embodiments may be used with the other, within the scope of the inventive concept.

I claim:

1. The combination of an adjustable storage cassette (1, 1′, 1″,) with an adjustment apparatus, wherein the storage cassette comprises a pair of generally L-shaped halves (1′, 1″) in which the upstanding legs of the L of the halves are adapted to retain product holder means (2, 2′) for sheet-like products (3), particularly printed products, and the angled legs of the L of the halves are facing each other; and means (13) for releasably connecting the horizontal legs of the L-shaped halves together and determining the spacing of the upstanding legs of said halves; and wherein the adjustment apparatus comprises a support (15);

means (5, 6, 7, 9) for moving the storage cassette (1) in a predetermined direction (4; 22) towards the adjustment apparatus;

a pair of cassette holder means (26, 28, 37) positioned on the support for engagement with respective ones of the legs of the respective halves (1′, 1″) of the storage cassette (1), and wherein at least one of said cassette holder means is movable with respect to the other in a direction in which the L-shaped halves (1′, 1″) are moved toward or away from each other to move the respective half of the storage cassette in a predetermined position with respect to the other to thereby determine the spacing between the upstanding legs of the L-shaped halves of the cassette when the releasable connecting means (13) are loosened.

2. The combination of claim 1, further including product holder means (2, 2′) located on and supported by the upstanding legs of the L-shaped halves (1′, 1″).

3. The combination of claim 1, wherein the cassette holder means (28, 37) comprise energizable electromagnets which, upon energization, engage the respective halves (1′, 1″) of the storage cassette, and wherein a laterally shiftable arm (35) is provided, retaining one of said electromagnets to form said movable holder means and permitting shifting of the respective magnets thereon, and carrying along the respectively magnetically retained L-shaped half during said shifting movement to move said half to said predetermined position.

4. The combination of claim 3, wherein a motor drive (29) is provided, coupled to said movable electromagnet (37) for shifting said electromagnet and hence said cassette half (1″).

5. The combination of claim 4, wherein said motor drive includes a motor (29), a spindle (30) and a ball spindle nut (32) for converting rotary movement of the motor to translatory movement;

and wherein a support platform (34) is provided, guided for translatory movement, and supporting said electromagnet.

6. The combination of claim 1, wherein two cassette holder means are provided, one (37) of said holder means being shiftable over a distance to position the respectively engaged cassette half (1″) to said predetermined position;

and wherein the other holder means (27) is movable between an engaged and disengaged position (26′, 26″) to provide for positioning clearance for the storage cassette on the adjustment apparatus, and engagement with the respective half (1′) of the storage cassette with respect to a reference position (10).

7. The combination of claim 1 wherein the storage cassette moving means includes a transport carriage (5) supporting said storage cassette (1);

locating means (10, 11, 12) secured to said transport carriage for positioning the cassette (1) on said transport carriage;

guide rails (7, 8) guiding said transport carriage in a predetermined guide path;

the support comprises a support platform (15);

two operating means (24, 29) located on said support platform (15), and coupled to said cassette holder means (26, 28, 37) for, respectively, positioning the cassette holder means against the respective halves (1′, 1″) of the storage cassette (1), and moving said cassette holder means with respect thereto;

and a release-tightening tool (38, 39) operatively associated with and selectively engageable with and disengageable from said releasable connection means (13) for, selectively, releasing or tightening said connection means to permit adjustment of the respective halves (1′, 1″) with respect to each other and tightening said halves in said predetermined position.

8. The combination of claim 7, further including a pair of movable arms (26, 35) coupled to the respective operating means (24, 29) and connecting the respective operating means to said cassette holding means;

and wherein said release-tightening tool is located on said support platform (15) between said arms, and is vertically movable with respect to said releasable connecting means for selective engagement or disengagement therefrom.

9. The combination of claim 8, wherein at least one of said operating means comprises a pneumatic piston-cylinder arrangement (24).

10. The combination of claim 7, wherein at least one of said operating means (29) comprises a motor (29), a spindle (30) and a ball spindle nut (32) for converting rotary movement of the motor to translatory movement;

and wherein a support platform (34) is provided, guided for translatory movement, and supporting said electromagnet.

11. The combination of claim 7, further including platform guide means (16, 17, 20) extending parallel to said predetermined guide path;

and platform transport means (18, 42) coupled to the support platform (15) and moving the support platform (15) in synchronism with movement (4) of said storage cassette along said predetermined guide path.

12. The combination of claim 7, wherein the platform transport means comprises a motor-driven chain (42) coupled to the support platform (15) for moving the support platform (15) parallel to said predetermined guide path.

13. The combination of claim 7 wherein the platform transport means comprises a spindle-spindle nut drive (16, 17, 18).

14. The combination of claim 11, wherein the release-tightening tool is first engaged against said releasable connecting means for releasing the L-shaped halves with respect to each other and when the transport carriage is moving in said predetermined guide path and parallel to said platform (15), said cassette holder means moving the respective halves in said predetermined position during continuous movement of said carriage (5) and said platform (15) for positioning said halves in said predetermined position and with a predetermined spacing (B″) with respect to each other, and, during further continued movement, re-tightening of the releasable connection means, said releasable connection means and said cassette holder means then disengaging from the cassette and permitting movement of the platform in a direction counter the continued movement of the cassette to return the platform to a starting or rest position (0).

15. The combination of claim 1 wherein the storage cassette moving means includes transport carriage support means (5);

guide means (7, 8) guiding said transport carriage support means in a predetermined guide path;

the support comprises a support structure (15);

two operating means (24, 29) located on said support structure (15) and coupled to said cassette holder means (26, 28, 37) for, respectively, positioning the cassette holder means against the respective halves (1′, 1″) of the storage cassette (1) and moving the cassette holder means with respect thereto; and operating means (38, 39) operatively engageable with said releasable connection means (13) for, selectively, releasing or tightening said connection means to permit adjustment of the respective halves (1′, 1″) with respect to each other and tightening said halves in said predetermined position.

16. The combination of claim 15 further including transport means (18, 42) coupled to the support structure (15) and moving the support structure in synchronism with movement (4) of said storage cassette along said predetermined guide path, said operating means moving said cassette holder means while the support platform (15) is moving in synchronism with movement of said storage cassette.

17. The combination of claim 16 wherein said transport means (18, 42) moves said support platform in a direction reverse to that of the movement of said storage cassette upon disengagement of the operating means (24, 29) from said respective halves, and at a speed, in the reverse direction, which is high with respect to said movement in synchronism with the movement of said storage cassette along said predetermined guide path.

18. A method to adjust the width of a storage cassette (1) having a pair of generally L-shaped halves (1, 1′), in which the upstanding legs of the L halves are adapted to retain product holder means (2, 2′) for sheet products (3), and the horizontal legs of the L face each other, and releasable connection means (13) are provided retaining the horizontal legs of the L together and determining the spacing of the upstanding legs of the L-shaped halves, comprising the steps of placing said cassette on a support (5) and moving said support in a predetermined guide path at a predetermined speed;

engaging said cassettes with holder means (28, 37) moving at said speed with the cassette;

engaging the releasable connecting means with a release-and-tightening tool (38, 39), moving at the same speed as said cassette; and loosening the connection means;

moving said holder means, as the cassette moves in said guide path, to position the respective halves on said support with a predetermined spacing between the upstanding legs of the L-shaped halves, while engaged by said cassette holder means;

tightening the releasable connection means by operating said release-and-tightening tool in tightening direction, while the cassette and said tool, and said holder means continue to move along said guide path;

releasing said cassette holder means from said cassette; and returning said cassette holder means and said release-and-tightening tool to an initial or rest position for engagement with a subsequent cassette, in a direction counter the movement along said guide path and at a high speed with respect to the movement of the cassette along said guide path.

* * * * *